United States Patent
Chang et al.

(10) Patent No.: US 9,755,421 B2
(45) Date of Patent: Sep. 5, 2017

(54) CONTROL CIRCUIT APPLIED TO A POWER CONVERTER AND OPERATION METHOD THEREOF

(71) Applicant: Leadtrend Technology Corp., Hsin-Chu (TW)

(72) Inventors: Chih-Chi Chang, Hsin-Chu (TW); Da-Chun Wei, Hsin-Chu (TW); Ming-Chang Tsou, Hsin-Chu (TW); Meng-Jen Tsai, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 482 days.

(21) Appl. No.: 14/599,554

(22) Filed: Jan. 19, 2015

(65) Prior Publication Data
US 2015/0207311 A1 Jul. 23, 2015

(30) Foreign Application Priority Data

Jan. 23, 2014 (TW) .............................. 103102528 A (51) Int. Cl.
| | |
|---|---|
| H02H 7/10 | (2006.01) |
| H02H 3/20 | (2006.01) |
| H02H 5/04 | (2006.01) |
| H02H 7/12 | (2006.01) |

(52) U.S. Cl.
CPC .............. *H02H 5/042* (2013.01); *H02H 3/20* (2013.01); *H02H 7/1213* (2013.01)

(58) Field of Classification Search
CPC ......... H02H 3/20; H02H 5/042; H02H 7/1213
USPC ....................................................... 361/91.1
See application file for complete search history.

(56) References Cited

U.S. PATENT DOCUMENTS

| | | | | |
|---|---|---|---|---|
| 2010/0302814 A1* | 12/2010 | Lu | ..................... | H02M 3/33523 363/21.01 |
| 2013/0083562 A1* | 4/2013 | Wu | ........................ | H02M 1/32 363/16 |

FOREIGN PATENT DOCUMENTS

| | | |
|---|---|---|
| CN | 1259792 A | 7/2000 |
| CN | 101958650 A | 1/2011 |
| CN | 103036454 A | 4/2013 |
| CN | 103066872 A | 4/2013 |
| CN | 103427647 A | 12/2013 |
| TW | 201225463 | 6/2012 |
| TW | I374605 | 10/2012 |
| TW | 201316159 | 4/2013 |
| TW | I420790 | 12/2013 |

\* cited by examiner

*Primary Examiner* — Thienvu Tran
*Assistant Examiner* — Kevin J Comber
(74) *Attorney, Agent, or Firm* — Winston Hsu (57) ABSTRACT

A control circuit applied to a power converter includes a multi-functional pin, a zero-crossing signal generator, and an over-voltage detector. The multi-functional pin is used for receiving an auxiliary current generated by an auxiliary winding of the power converter, and an input current. The zero-crossing signal generator is used for generating a zero-crossing signal according to the auxiliary current. The over-voltage detector is used for generating an over-voltage signal according to the auxiliary current. The control circuit generates a switch control signal to the power switch according to the zero-crossing signal, or generates an over-voltage protection signal to the power switch according to the over-voltage signal.

33 Claims, 7 Drawing Sheets

CONTROL CIRCUIT APPLIED TO A POWER CONVERTER AND OPERATION METHOD THEREOF

BACKGROUND OF THE INVENTION

1. Field of the Invention

The present invention relates to a control circuit applied to a power converter and an operation method thereof, and particularly to a control circuit and an operation method thereof that can simultaneously realize a brown-out protection, an over-temperature protection, and an over-voltage protection.

2. Description of the Prior Art

In the prior art, a control circuit applied to a power converter integrates a brown-out protection and an over-temperature protection into the same pin, and a current sensing pin detects an output voltage of a secondary side of the power converter through an auxiliary winding of the power converter to execute an over-voltage protection when a power switch of the power converter is turned off.

In the prior art, the control circuit executes the over-temperature protection when an alternating current voltage received by a rectifier of the power converter is at a negative half cycle, and executes the brown-out protection when the alternating current voltage received by the rectifier of the power converter is at a positive half cycle. In addition, the current sensing pin samples a voltage generated by the auxiliary winding to determine whether the over-voltage protection occurs after the power switch of the power converter is turned off for a predetermined time. In addition, if the prior art wants to newly add a zero-crossing function to control turning-on and turning-off of the power switch or executes a quasi resonant mode operation, the control circuit needs to add a feedback pin additionally. Thus, the control circuit with six-pin provided by the prior art cannot simultaneously realize the brown-out protection, the over-temperature protection, and the over-voltage protection.

SUMMARY OF THE INVENTION

An embodiment of the present invention provides a control circuit applied to a power converter, wherein the control circuit has a brown-out protection, an over-temperature protection, and an over-voltage protection. The control circuit includes a multi-functional pin, a zero-crossing signal generator, and an over-voltage detector. The multi-functional pin is used for receiving an auxiliary current generated by an auxiliary winding of the power converter, and an input current. The zero-crossing signal generator is used for generating a zero-crossing signal according to the auxiliary current. The over-voltage detector is used for generating an over-voltage signal according to the auxiliary current. The control circuit generates a switch control signal to a power switch of the power converter according to the zero-crossing signal, or generates an over-voltage protection signal to the power switch according to the over-voltage signal.

Another embodiment of the present invention provides an operation method applied to a brown-out protection, an over-temperature protection, and an over-voltage protection of a control circuit of a power converter, wherein the control circuit includes a multi-functional pin, a zero-crossing signal generator, an over-voltage detector, a sample and hold unit, a subtractor, a current to voltage converter, a switching circuit, a brown-out detection circuit, and an over-temperature detection circuit, wherein the multi-functional pin is coupled to a rectifier of the power converter and a thermistor. The operation method includes the sample and hold unit generating a sampling current according to an input current received by the multi-functional pin, and the brown-out detection circuit or the over-temperature detection circuit executing a first corresponding operation according to an alternating current voltage when a power switch of the power converter is turned on; the multi-functional pin receiving an auxiliary current generated by an auxiliary winding of the power converter and the input current when the power switch is turned off; the subtractor subtracting the input current received by the multi-functional pin according to the sampling current to filter the auxiliary current, wherein the sampling current is substantially equal to the input current when the power switch is turned off; and the over-voltage detector or the zero-crossing signal generator executing a second corresponding operation according to the auxiliary current when the power switch is turned off.

Another embodiment of the present invention provides an operation method applied to a brown-out protection, an over-temperature protection, and an over-voltage protection of a control circuit of a power converter, wherein the control circuit includes a multi-functional pin, a zero-crossing signal generator, an over-voltage detector, a sample and hold unit, a subtractor, and a current to voltage converter. The operation method includes the sample and hold unit generating a sampling current according to an input current received by the multi-functional pin when a power switch of the power converter is turned on and an alternating current voltage is at a positive half cycle; the multi-functional pin receiving an auxiliary current generated by an auxiliary winding of the power converter and the input current when the power switch is turned off; the subtractor subtracting the input current received by the multi-functional pin according to the sampling current to filter the auxiliary current when the power switch is turned off, wherein the sampling current is substantially equal to the input current; and the over-voltage detector or the zero-crossing signal generator executing a third corresponding operation according to the auxiliary current when the power switch is turned off.

The present invention provides a control circuit applied to a power converter and an operation method thereof. The control circuit and the operation method utilize an auxiliary current received by a multi-functional pin and an over-voltage detector to execute an over-voltage protection when a power switch of the power converter is turned off, and utilize the auxiliary current received by the multi-functional pin and a zero-crossing signal generator to control turning-on of the power switch. In addition, when the power switch is turned on and an alternating current voltage is at a positive half cycle, the control circuit and the operation method utilize a brown-out detection circuit and a detection voltage corresponding to the positive half cycle of the alternating current voltage to execute a brown-out protection, and when the power switch is turned on and the alternating current voltage is at a negative half cycle, the control circuit and the operation method utilize an over-temperature detection circuit and a voltage signal corresponding to an ambient temperature to execute an over-temperature protection. Therefore, the present invention can simultaneously realize the brown-out protection, the over-temperature protection, and the over-voltage protection in the present six-pin or high-voltage eight-pin series integrated circuits.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
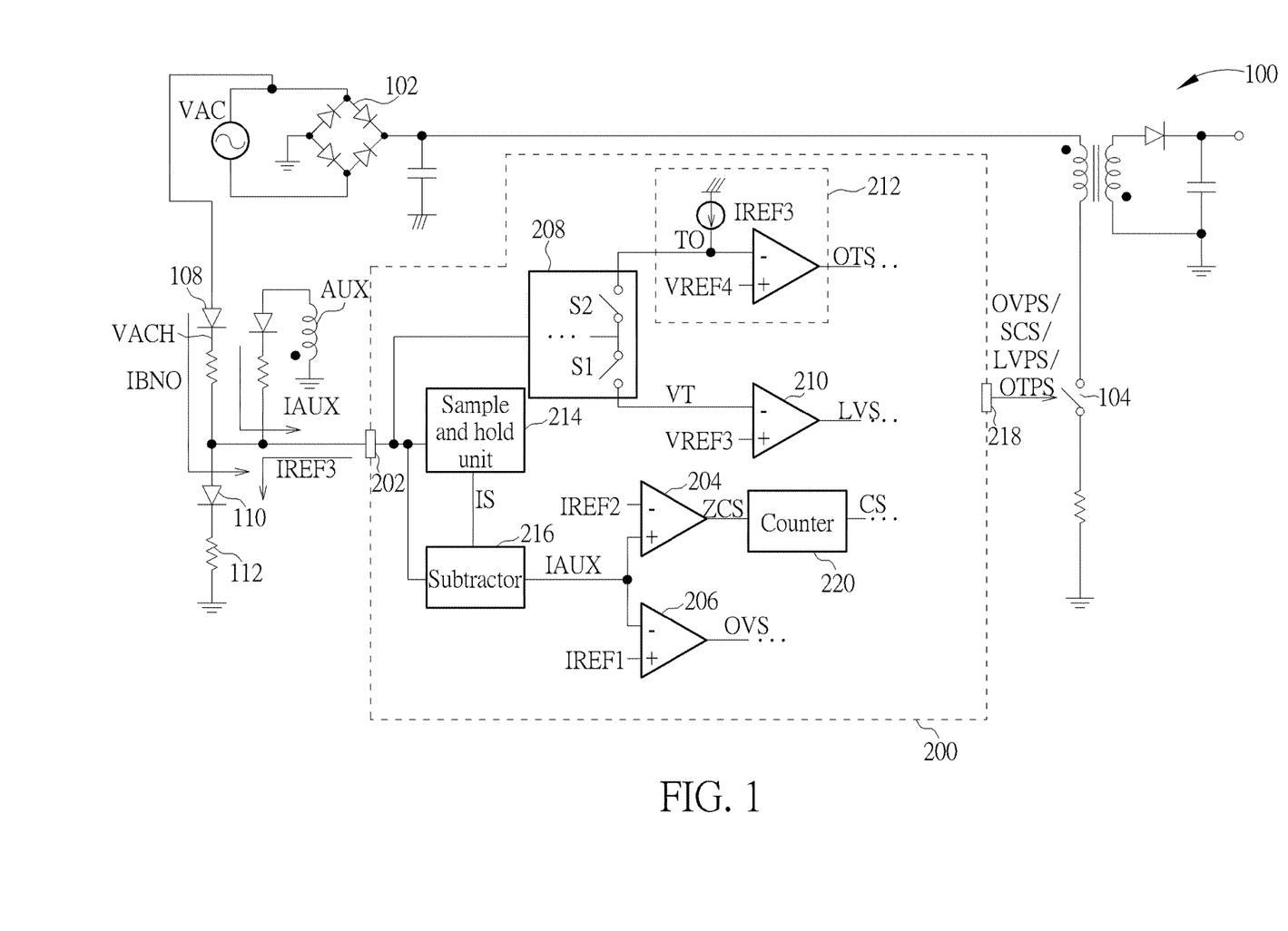
FIG. 1 is a diagram illustrating a control circuit applied to a power converter according to an embodiment.

Please refer to FIG. 1. FIG. 1 is a diagram illustrating a control circuit 200 applied to a power converter 100 according to an embodiment, wherein the control circuit 200 has a brown-out protection, an over-temperature protection, and an over-voltage protection. The control circuit 200 includes a multi-functional pin 202, a zero-crossing signal generator 204, an over-voltage detector 206, a switching circuit 208, a brown-out detection circuit 210, an over-temperature detection circuit 212, a sample and hold unit 214, and a subtractor 216. As shown in FIG. 1, the sample and hold unit 214 is coupled to the multi-functional pin 202, and the subtractor 216 is coupled to the multi-functional pin 202 and the sample and hold unit 214. The sample and hold unit 214 is used for generating a sampling current IS corresponding to a positive half cycle of an alternating current voltage VAC according to an input current IBNO received by the multi-functional pin 202 when the alternating current voltage VAC is at the positive half cycle and a power switch 104 of the power converter 100 is turned on, wherein the sampling current IS is substantially equal to the input current IBNO. As shown in FIG. 1, because the multi-functional pin 202 is coupled to a rectifier 102 of the power converter 100 through a diode 108, the diode 108 is necessary to prevent a current from the control circuit 200 from reversing to an alternating current power source of the power converter 100 when the alternating current voltage VAC is at a negative half cycle. When the power switch 104 of the power converter 100 is turned off, the multi-functional pin 202 is used for receiving an auxiliary current IAUX generated by an auxiliary winding AUX of the power converter 100, and the input current IBNO. The subtractor 216 is used for subtracting the input current IBNO received by the multi-functional pin 202 according to the sampling current IS to filter the auxiliary current IAUX. When the power switch 104 of the power converter 100 is turned off and the auxiliary current IAUX is greater than a first reference current IREF1, the over-voltage detector 206 generates an over-voltage signal OVS. Then, the control circuit 200 can generate an over-voltage protection signal OVPS according to the over-voltage signal OVS, and transmit the over-voltage protection signal OVPS to the power switch 104 through a gate pin 218, wherein the power switch 104 can be turned off according to the over-voltage protection signal OVPS. When the power switch 104 of the power converter 100 is turned off and the auxiliary current IAUX is less than the first reference current IREF1, the zero-crossing signal generator 204 is used for generating a zero-crossing signal ZCS according to the auxiliary current IAUX and a second reference current IREF2. That is to say, the auxiliary current IAUX is reduced gradually, so the zero-crossing signal generator 204 can generate the zero-crossing signal ZCS when the auxiliary current IAUX is less than the second reference current IREF2. The control circuit 200 further includes a counter 220, wherein the counter 220 is coupled to the zero-crossing signal generator 204 for generating a control signal CS according to a predetermined quantity and the zero-crossing signal ZCS. That is to say, the counter 220 can generate the control signal CS at a valley of the auxiliary current IAUX corresponding to the predetermined quantity. Then, the control circuit 200 can generate a switch control signal SCS according to the control signal CS, and transmit the switch control signal SCS to the power switch 104 through the gate pin 218, wherein the power switch 104 can be turned on according to the switch control signal SCS.

Figure 2:
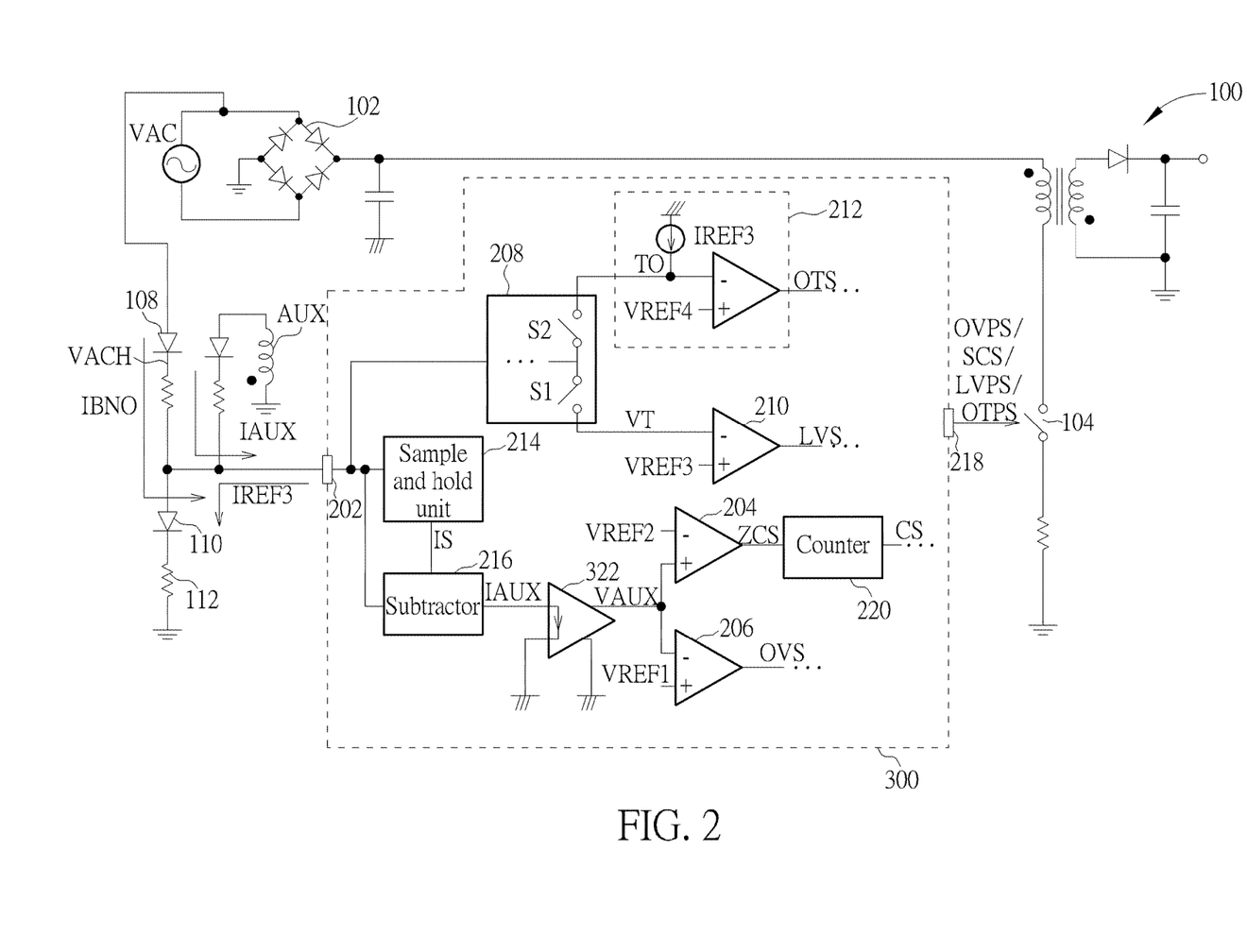
FIG. 2 is a diagram illustrating a control circuit applied to the power converter according to another embodiment.

Please refer to FIG. 2. FIG. 2 is a diagram illustrating a control circuit 300 applied to the power converter 100 according to another embodiment. As shown in FIG. 2, a difference between the control circuit 300 and the control circuit 200 is that the control circuit 300 further includes a current to voltage converter 322, wherein the current to voltage converter 322 is used for generating an auxiliary voltage VAUX according to the auxiliary current IAUX. As shown in FIG. 2, when the power switch 104 of the power converter 100 is turned off and the auxiliary voltage VAUX is greater than a first reference voltage VREF1, the over-voltage detector 206 generates the over-voltage signal OVS; when the power switch 104 of the power converter 100 is turned off and the auxiliary voltage VAUX is less than the first reference voltage VREF1, the zero-crossing signal generator 204 is used for generating the zero-crossing signal ZCS according to the auxiliary voltage VAUX and a second reference voltage VREF2. The counter 220 can generate the control signal CS according to the predetermined quantity and the zero-crossing signal ZCS. That is to say, the counter 220 can generate the control signal CS at a valley of the auxiliary voltage VAUX corresponding to the predetermined quantity. In addition, subsequent operational principles of the control circuit 300 are the same as those of the control circuit 200, so further description thereof is omitted for simplicity.

Figure 3:
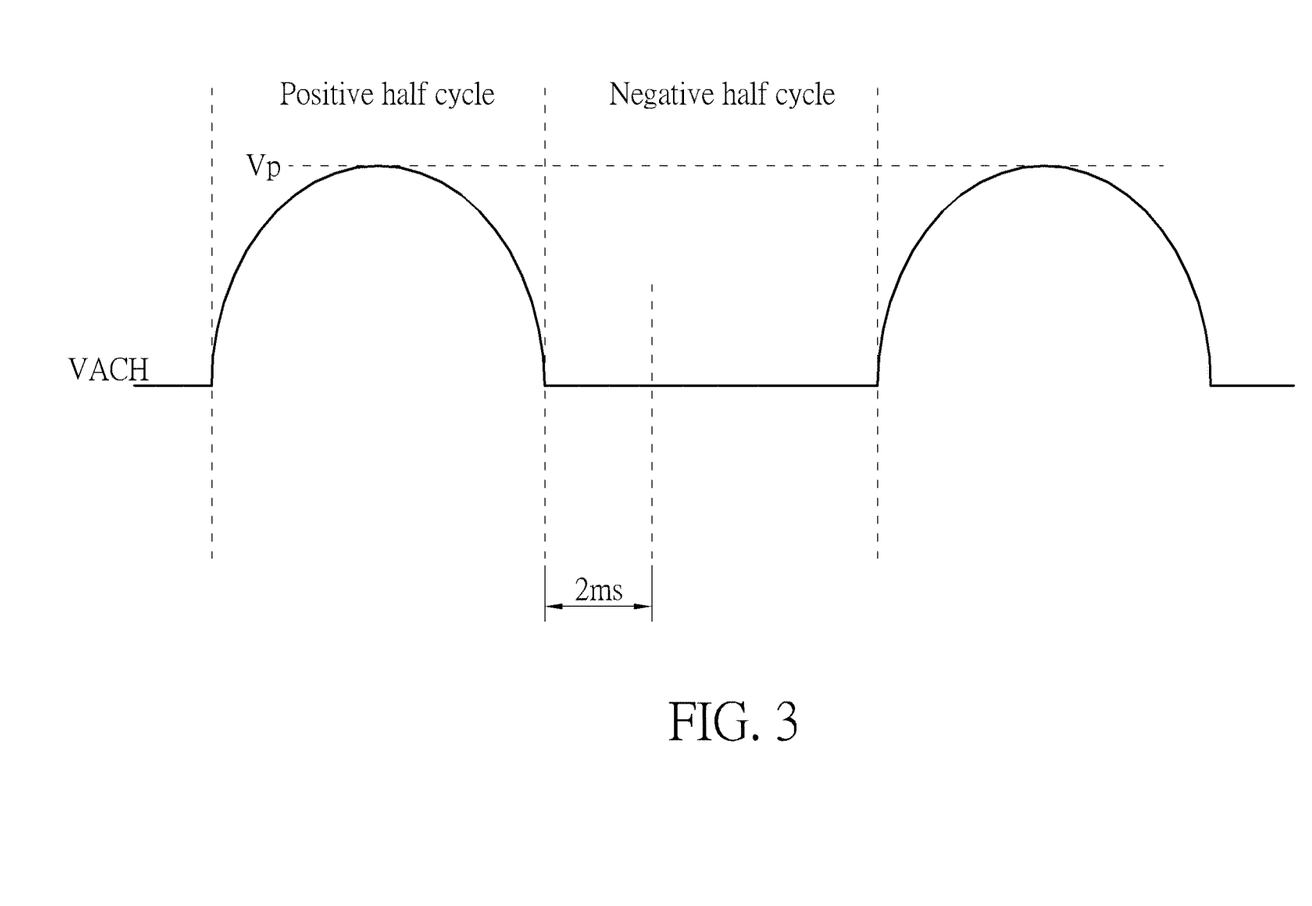
FIG. 3 is a diagram illustrating a half-wave alternating current voltage generated through the diode.

Please refer to FIG. 3. FIG. 3 is a diagram illustrating a half-wave alternating current voltage VACH generated through the diode 108. As shown in FIG. 1, FIG. 2, and FIG. 3, when the half-wave alternating current voltage VACH is at a positive half cycle, the input current IBNO flowing into the multi-functional pin 202 is greater than 0A. Meanwhile, the switching circuit 208 receives the input current IBNO and makes the brown-out detection circuit 210 be coupled to the multi-functional pin 202 (that is, a switch S1 is turned on, and a switch S2 is turned off), and the brown-out detection circuit 210 starts to sample the input current IBNO, wherein a sampling period is substantially equal to the positive half cycle of the half-wave alternating current voltage VACH. In addition, the input current IBNO is limited to a very small range (such as 8 uA to 40 uA, but the present invention is not limited to the input current IBNO being between 8 uA-40 uA) to reduce power loss of the positive half cycle of the half-wave alternating current voltage VACH. In addition, the input current IBNO corresponds to a peak value VP of the half-wave alternating current voltage VACH. As shown in FIG. 1, the switching circuit 208 can generate a detection voltage VT according to the input current IBNO, and the brown-out detection circuit 210 is used for comparing the detection voltage VT and a third reference voltage VREF3. When the detection voltage VT is less than the third reference voltage VREF3, the brown-out detection circuit 210 can generate a brown-out signal LVS, and the control circuit 200 and the control circuit 300 can generate a brown-out protection signal LVPS according to the brown-out signal LVS, and transmit the brown-out protection signal LVPS to the power switch 104 through the gate pin 218 to execute the brown-out protection.

When the half-wave alternating current voltage VACH is at a negative half cycle, the input current IBNO flowing into the multi-functional pin 202 is substantially equal to or less than zero. Meanwhile, the switching circuit 208 makes the over-temperature detection circuit 212 be coupled to the multi-functional pin 202 (that is, the switch S1 is turned off, and the switch S2 is turned on), and a third reference current IREF3 within the over-temperature detection circuit 212 can flow to the thermistor 112 through the multi-functional pin 202 to form a voltage signal TO corresponding to an ambient temperature, wherein the voltage signal TO can be received by the over-temperature detection circuit 212. As shown in FIG. 3, the over-temperature detection circuit 212 can compare the voltage signal TO with a fourth reference voltage VREF4 within 2 ms after a beginning of the negative half cycle of the half-wave alternating current voltage VACH, and generate an over-temperature signal OTS when the voltage signal TO is greater than the fourth reference voltage VREF4. Then, the control circuit 200 and the control circuit 300 can generate an over-temperature protection signal OTPS according to the over-temperature signal OTS, and transmit the over-temperature protection signal OTPS to the power switch 104 through the gate pin 218 to execute the over-temperature protection. But, the present invention is not limited to the over-temperature detection circuit 212 generating the over-temperature signal OTS according to the voltage signal TO and the fourth reference voltage VREF4 within 2 ms after the beginning of the negative half cycle of the half-wave alternating current voltage VACH. That is to say, any configuration in which the over-temperature detection circuit 212 generates the over-temperature signal OTS according to the voltage signal TO and the fourth reference voltage VREF4 within the negative half cycle of the half-wave alternating current voltage VACH falls within the scope of the present invention. In addition, when the half-wave alternating current voltage VACH is at the negative half cycle, the third reference current IREF3 can flow to the thermistor 112 through the multi-functional pin 202, so a diode 110 is unnecessary. That is to say, the multi-functional pin 202 can also be coupled to the thermistor 112 not through the diode 110.

In addition, after the control circuit 200 and the control circuit 300 determines the over-temperature protection (that is, after the negative half cycle of the half-wave alternating current voltage VACH is completed, and the positive half cycle of the half-wave alternating current voltage VACH restarts), the switching circuit 208 needs to detect the input current IBNO flowing into the multi-functional pin 202 or the third reference current IREF3 flowing out the multi-functional pin 202 again to detect a voltage cycle of the half-wave alternating current voltage VACH. Thus, the control circuit 200 and the control circuit 300 can complete the brown-out protection and the over-temperature protection during turning-on of the power switch 104.

Figure 4A:
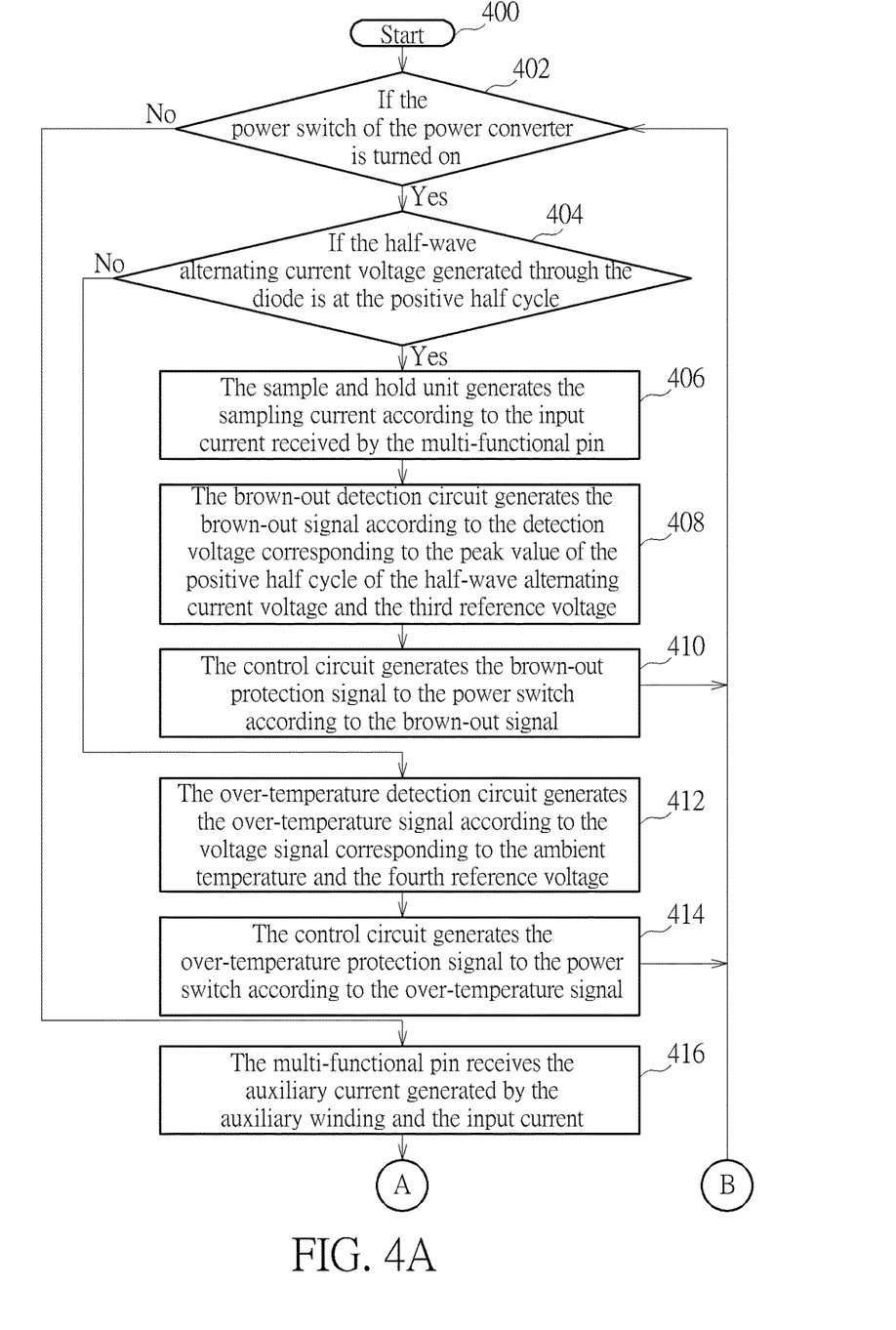
FIG. 4A and FIG. 4B are flowcharts illustrating an operation method applied to a brown-out protection, an over-temperature protection, and an over-voltage protection of a control circuit of a power converter according to another embodiment.
Figure 4B:
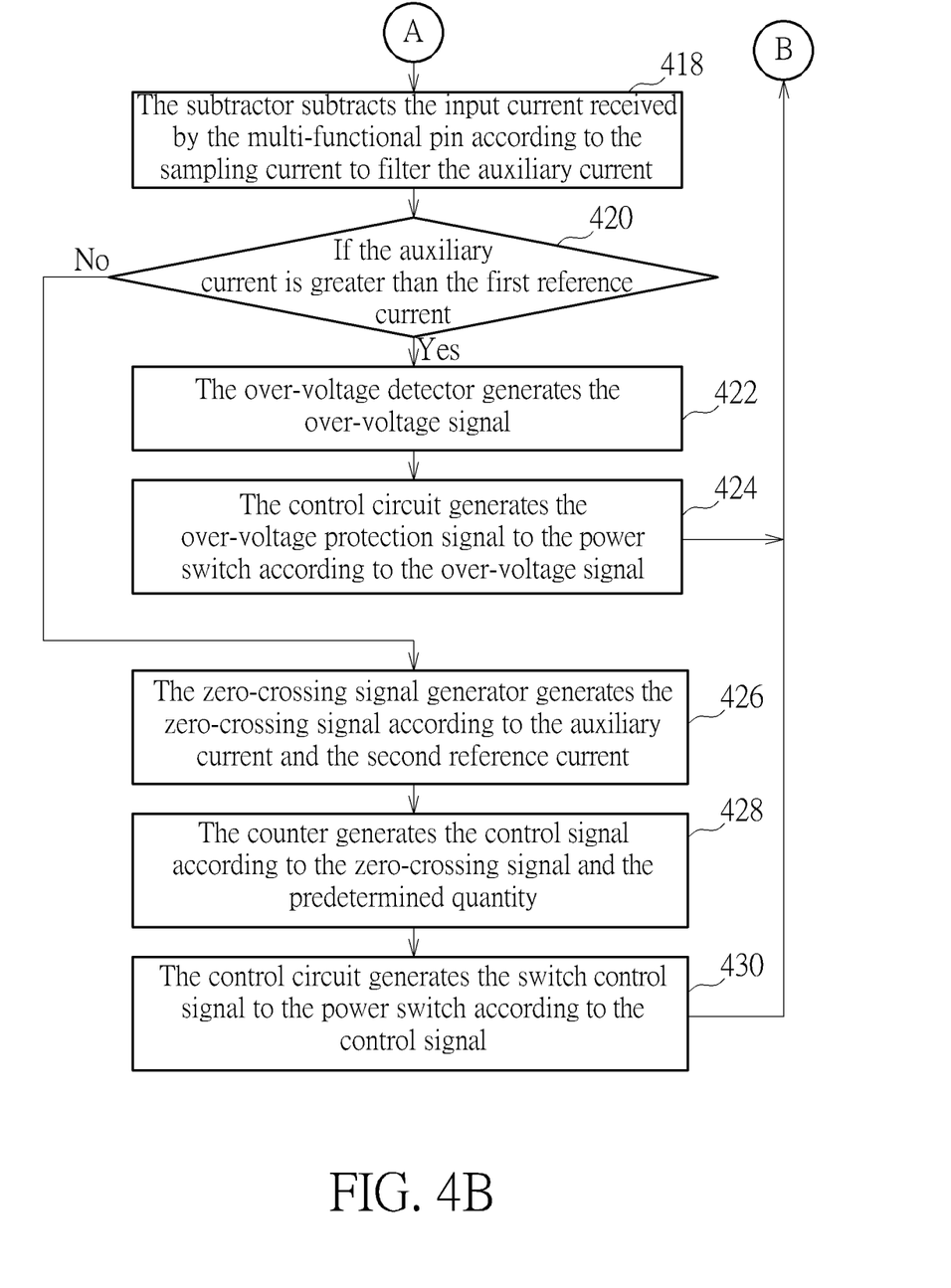

Please refer to FIG. 1, FIG. 3, FIG. 4A, and FIG. 4B. FIG. 4A and FIG. 4B are flowcharts illustrating an operation method applied to a brown-out protection, an over-temperature protection, and an over-voltage protection of a control circuit of a power converter according to another embodiment. The operation method in FIG. 4A and FIG. 4B is illustrated using the power converter 100 and the control circuit 200 in FIG. 1. Detailed steps are as follows:

Step 400: Start.

Step 402: If the power switch 104 of the power converter 100 is turned on; if yes, go to Step 404; if no, go to Step 416.

Step 404: If the half-wave alternating current voltage VACH generated through the diode 108 is at the positive half cycle; if yes, go to Step 406; if no, go to Step 412.

Step 406: The sample and hold unit 214 generates the sampling current IS according to the input current IBNO received by the multi-functional pin 202.

Step 408: The brown-out detection circuit 210 generates the brown-out signal LVS according to the detection voltage VT corresponding to the peak value VP of the positive half cycle of the half-wave alternating current voltage VACH and the third reference voltage VREF3.

Step 410: The control circuit 200 generates the brown-out protection signal LVPS to the power switch 104 according to the brown-out signal LVS, go to Step 402.

Step 412: The over-temperature detection circuit 212 generates the over-temperature signal OTS according to the voltage signal TO corresponding to the ambient temperature and the fourth reference voltage VREF4.

Step 414: The control circuit 200 generates the over-temperature protection signal OTPS to the power switch 104 according to the over-temperature signal OTS, go to Step 402.

Step 416: The multi-functional pin 202 receives the auxiliary current IAUX generated by the auxiliary winding AUX and the input current IBNO.

Step 418: The subtractor 216 subtracts the input current IBNO received by the multi-functional pin 202 according to the sampling current IS to filter the auxiliary current IAUX.

Step 420: If the auxiliary current IAUX is greater than the first reference current IREF1; if yes, go to Step 422; if no, go to Step 426.

Step 422: The over-voltage detector 206 generates the over-voltage signal OVS.

Step 424: The control circuit 200 generates the over-voltage protection signal OVPS to the power switch 104 according to the over-voltage signal OVS, go to Step 402.

Step 426: The zero-crossing signal generator 204 generates the zero-crossing signal ZCS according to the auxiliary current IAUX and the second reference current IREF2.

Step 428: The counter 220 generates the control signal CS according to the zero-crossing signal ZCS and the predetermined quantity.

Step 430: The control circuit 200 generates the switch control signal SCS to the power switch 104 according to the control signal CS, go to Step 402.

In Step 406, the sampling current IS is substantially equal to the input current IBNO. As shown in FIG. 1 and FIG. 3, in Step 408, when the half-wave alternating current voltage VACH is at the positive half cycle, the input current IBNO flowing into the multi-functional pin 202 is greater than 0A. Meanwhile, the switching circuit 208 receives the input current IBNO and makes the brown-out detection circuit 210 be coupled to the multi-functional pin 202 (that is, the switch S1 is turned on, and the switch S2 is turned off), and the brown-out detection circuit 210 starts to sample the input current IBNO, wherein the sampling period is substantially equal to the positive half cycle of the half-wave alternating current voltage VACH. In addition, the input current IBNO corresponds to the peak value VP of the half-wave alternating current voltage VACH. Meanwhile, as shown in FIG. 1, the switching circuit 208 can generate the detection voltage VT according to the input current IBNO, and the brown-out detection circuit 210 compares the detection voltage VT with the third reference voltage VREF3 to generate the brown-out signal LVS. In Step 410, the control circuit 200 can generate the brown-out protection signal LVPS to the power switch 104 according to the brown-out signal LVS to execute the brown-out protection.

In Step 412, when the half-wave alternating current voltage VACH is at a negative half cycle, the input current IBNO flowing into the multi-functional pin 202 is substantially equal to or less than zero. Meanwhile, the switching circuit 208 makes the over-temperature detection circuit 212 be coupled to the multi-functional pin 202, and the third reference current IREF3 within the over-temperature detection circuit 212 can flow to the thermistor 112 through the multi-functional pin 202 to form the voltage signal TO corresponding to the ambient temperature, wherein the voltage signal TO can be received by the over-temperature detection circuit 212. As shown in FIG. 3, the over-temperature detection circuit 212 can compare the voltage signal TO with the fourth reference voltage VREF4 within 2 ms after the beginning of the negative half cycle of the half-wave alternating current voltage VACH, and generate the over-temperature signal OTS when the voltage signal TO is greater than the fourth reference voltage VREF4. In Step 414, the control circuit 200 can generate the over-temperature protection signal OTPS to the power switch 104 according to the over-temperature signal OTS to execute the over-temperature protection. But, the present invention is not limited to the over-temperature detection circuit 212 generating the over-temperature signal OTS according to the voltage signal TO and the fourth reference voltage VREF4 within 2 ms after the beginning of the negative half cycle of the half-wave alternating current voltage VACH. That is to say, any configuration in which the over-temperature detection circuit 212 generates the over-temperature signal OTS according to the voltage signal TO and the fourth reference voltage VREF4 within the negative half cycle of the half-wave alternating current voltage VACH falls within the scope of the present invention.

After the control circuit 200 determines the over-temperature protection (that is, after the negative half cycle of the half-wave alternating current voltage VACH is completed, and the positive half cycle of the half-wave alternating current voltage VACH restarts), the switching circuit 208 needs to detect the input current IBNO flowing into the multi-functional pin 202 or the third reference current IREF3 flowing out the multi-functional pin 202 again to detect the voltage cycle of the half-wave alternating current voltage VACH. Thus, the control circuit 200 can complete the brown-out protection and the over-temperature protection during turning-on of the power switch 104.

In Step 416, when the power switch 104 of the power converter 100 is turned off, the multi-functional pin 202 is used for receiving the auxiliary current IAUX generated by the auxiliary winding AUX of the power converter 100 and the input current IBNO. In Step 418, the subtractor 216 subtracts the input current IBNO received by the multi-functional pin 202 according to the sampling current IS to filter the auxiliary current IAUX. In Step 422, when the auxiliary current IAUX is greater than the first reference current IREF1, the over-voltage detector 206 generates the over-voltage signal OVS. In Step 424, the control circuit 200 can generate the over-voltage protection signal OVPS to the power switch 104 according to the over-voltage signal OVS, wherein the power switch 104 can be turned off according to the over-voltage protection signal OVPS. In Step 426, when the auxiliary current IAUX is less than the first reference current IREF1, the zero-crossing signal generator 204 can generate the zero-crossing signal ZCS according to the auxiliary current IAUX and the second reference current IREF2. That is to say, the auxiliary current IAUX is reduced gradually, so the zero-crossing signal generator 204 can generate the zero-crossing signal ZCS when the auxiliary current IAUX is less than the second reference current IREF2. In Step 428, the counter 220 can generate the control signal CS according to the predetermined quantity and the zero-crossing signal ZCS. That is to say, the counter 220 can generate the control signal CS at the valley of the auxiliary current IAUX corresponding to the predetermined quantity. In Step 430, the control circuit 200 can generate the switch control signal SCS to the power switch 104 according to the control signal CS, wherein the power switch 104 can be turned on according to the switch control signal SCS.

Figure 5A:
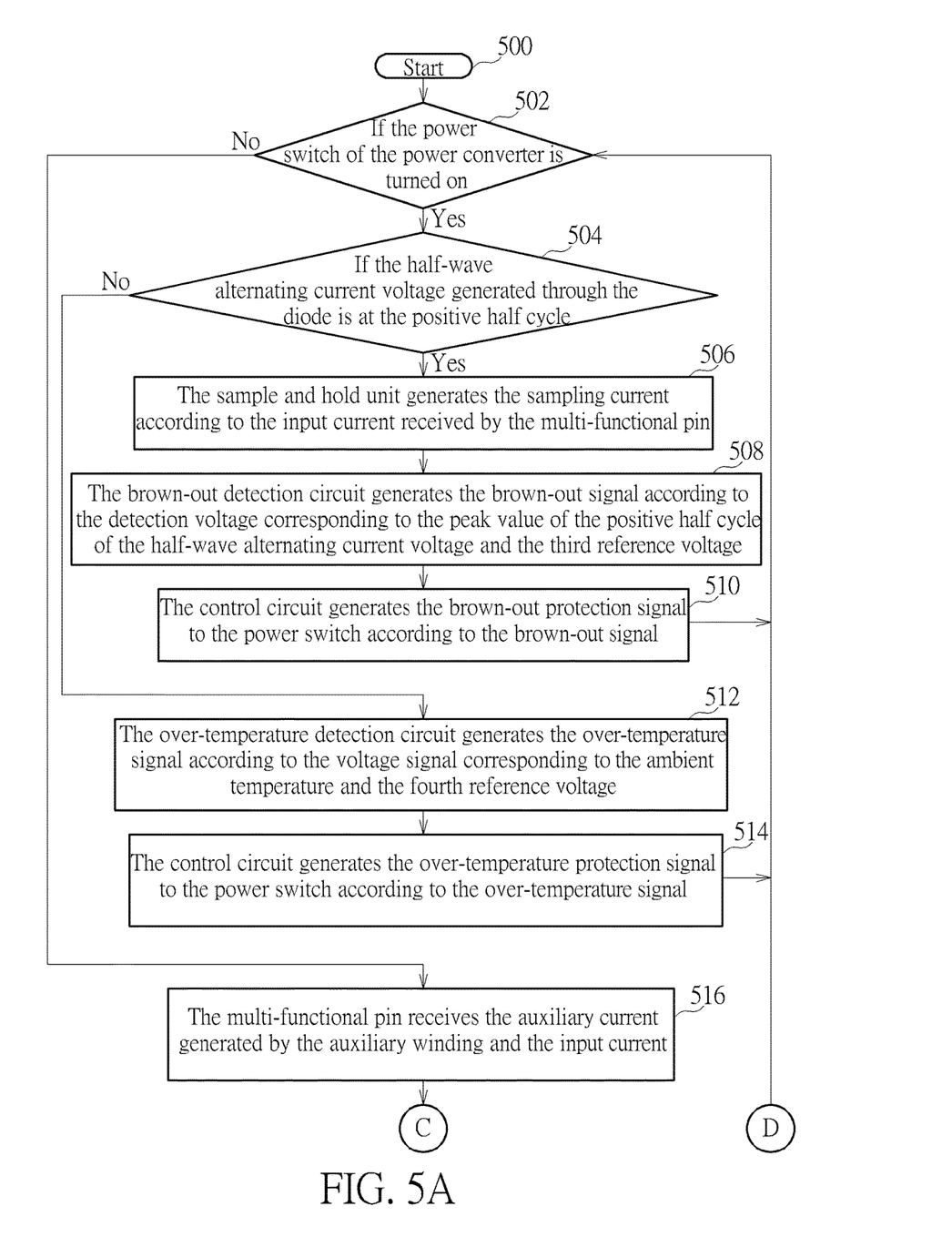
FIG. 5A and FIG. 5B are flowcharts illustrating an operation method applied to a brown-out protection, an over-temperature protection, and an over-voltage protection of a control circuit of a power converter according to another embodiment.
Figure 5B:
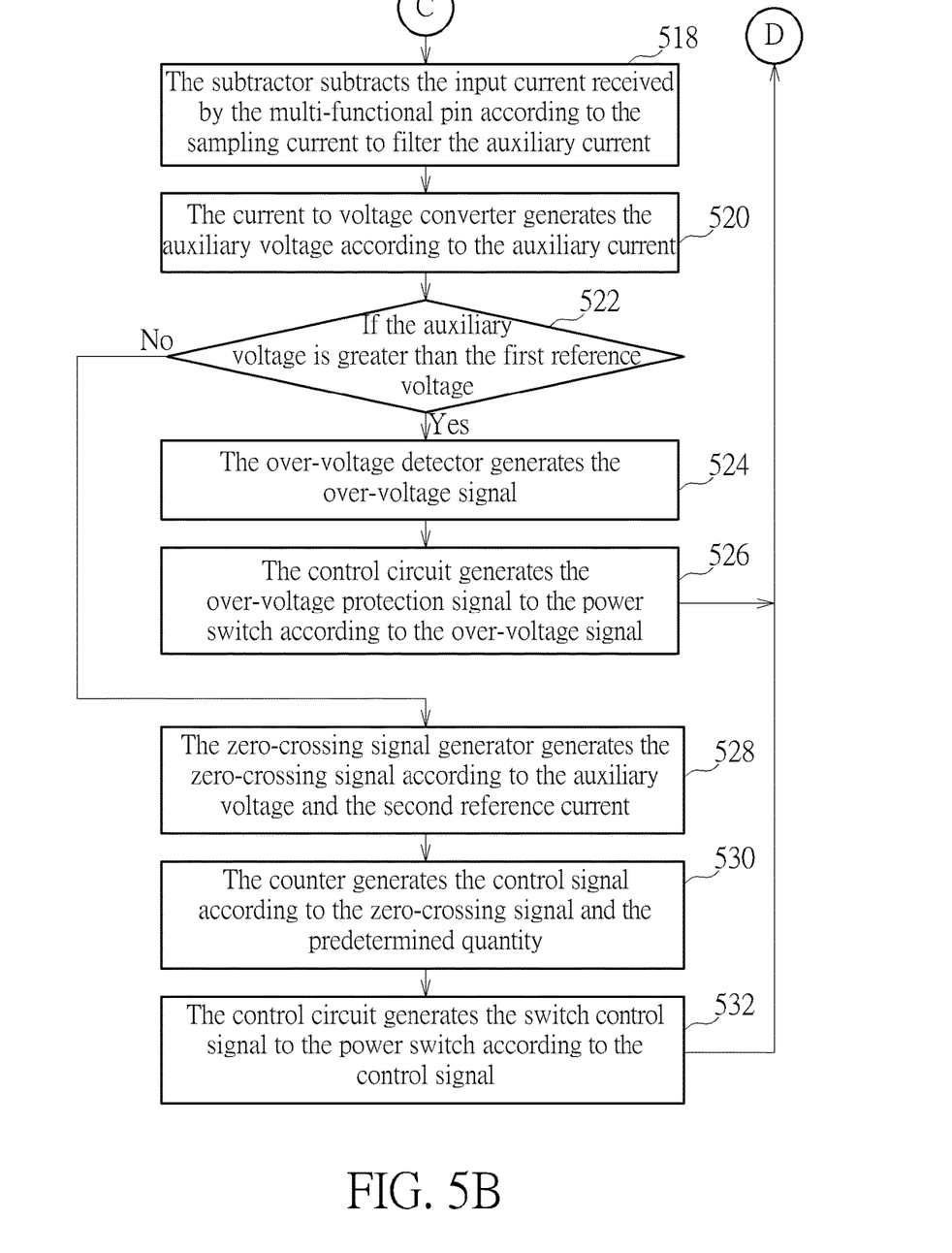

Please refer to FIG. 2, FIG. 3, FIG. 5A, and FIG. 5B. FIG. 5A and FIG. 5B are flowcharts illustrating an operation method applied to a brown-out protection, an over-temperature protection, and an over-voltage protection of a control circuit of a power converter according to another embodiment. The operation method in FIG. 5A and FIG. 5B is illustrated using the power converter 100 and the control circuit 300 in FIG. 2. Detailed steps are as follows:

Step 500: Start.

Step 502: If the power switch 104 of the power converter 100 is turned on; if yes, go to Step 504; if no, go to Step 516.

Step 504: If the half-wave alternating current voltage VACH generated through the diode 108 is at the positive half cycle; if yes, go to Step 506; if no, go to Step 512.

Step 506: The sample and hold unit 214 generates the sampling current IS according to the input current IBNO received by the multi-functional pin 202.

Step 508: The brown-out detection circuit 210 generates the brown-out signal LVS according to the detection voltage VT corresponding to the peak value VP of the positive half cycle of the half-wave alternating current voltage VACH and the third reference voltage VREF3.

Step 510: The control circuit 200 generates the brown-out protection signal LVPS to the power switch 104 according to the brown-out signal LVS, go to Step 502.

Step 512: The over-temperature detection circuit 212 generates the over-temperature signal OTS according to the voltage signal TO corresponding to the ambient temperature and the fourth reference voltage VREF4.

Step 514: The control circuit 200 generates the over-temperature protection signal OTPS to the power switch 104 according to the over-temperature signal OTS, go to Step 502.

Step 516: The multi-functional pin 202 receives the auxiliary current IAUX generated by the auxiliary winding AUX and the input current IBNO.

Step 518: The subtractor 216 subtracts the input current IBNO received by the multi-functional pin 202 according to the sampling current IS to filter the auxiliary current IAUX.

Step 520: The current to voltage converter 322 generates the auxiliary voltage VAUX according to the auxiliary current IAUX.

Step 522: If the auxiliary voltage VAUX is greater than the first reference voltage VREF1; if yes, go to Step 524; if no, go to Step 528.

Step 524: The over-voltage detector 206 generates the over-voltage signal OVS.

Step 526: The control circuit 200 generates the over-voltage protection signal OVPS to the power switch 104 according to the over-voltage signal OVS, go to Step 502.

Step 528: The zero-crossing signal generator 204 generates the zero-crossing signal ZCS according to the auxiliary voltage VAUX and the second reference current IREF2.

Step 530: The counter 220 generates the control signal CS according to the zero-crossing signal ZCS and the predetermined quantity.

Step 532: The control circuit 200 generates the switch control signal SCS to the power switch 104 according to the control signal CS, go to Step 502.

A difference between the embodiment in FIG. 5A and FIG. 5B and the embodiment in FIG. 4A and FIG. 4B is that in Step 520, the current to voltage converter 322 generates the auxiliary voltage VAUX according to the auxiliary current IAUX. Therefore, as shown in FIG. 2, in Step 522 and Step 524, when the auxiliary voltage VAUX is greater than the first reference voltage VREF1, the over-voltage detector 206 can generate the over-voltage signal OVS; and in Step 528, when the auxiliary voltage VAUX is less than the first reference voltage VREF1, the zero-crossing signal generator 204 can generate the zero-crossing signal ZCS according to the auxiliary voltage VAUX and the second reference voltage VREF2. In addition, subsequent operational principles of the embodiment in FIG. 5A and FIG. 5B are the same as those of the embodiment in FIG. 4A and FIG. 4B, so further description thereof is omitted for simplicity.

To sum up, the control circuit applied to the power converter and the operation method thereof utilize the auxiliary current received by the multi-functional pin and the over-voltage detector to execute the over-voltage protection when the power switch is turned off, and utilize the auxiliary current received by the multi-functional pin and the zero-crossing signal generator to control turning-on of the power switch. In addition, when the power switch is turned on and the alternating current voltage is at the positive half cycle, the control circuit and the operation method utilize the brown-out detection circuit and the detection voltage corresponding to the positive half cycle of the alternating current voltage to execute the brown-out protection, and when the power switch is turned on and the alternating current voltage is at the negative half cycle, the control circuit and the operation method utilize the over-temperature detection circuit and the voltage signal corresponding to the ambient temperature to execute the over-temperature protection. Therefore, the present invention can simultaneously realize the brown-out protection, the over-temperature protection, and the over-voltage protection in the present six-pin or high-voltage eight-pin series integrated circuits.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit applied to a power converter, the control circuit having a brown-out protection, an over-temperature protection, and an over-voltage protection, the control circuit comprising:
a multi-functional pin for receiving an auxiliary current generated by an auxiliary winding of the power converter, and an input current;
a zero-crossing signal generator for generating a zero-crossing signal according to the auxiliary current;
an over-voltage detector for generating an over-voltage signal according to the auxiliary current;
a sample and hold unit coupled to the multi-functional pin for generating a sampling current corresponding to a positive half cycle of an alternating current voltage according to the input current received by the multi-functional pin when the alternating current voltage is at the positive half cycle and the power switch is turned on;
and a subtractor coupled to the multi-functional pin and the sample and hold unit for subtracting the input current received by the multi-functional pin according to the sampling current to filter the auxiliary current when the power switch is turned off, wherein the sampling current is substantially equal to the input current;
wherein the control circuit generates a switch control signal to a power switch of the power converter according to the zero-crossing signal, or generates an over-voltage protection signal to the power switch according to the over-voltage signal.

2. The control circuit of claim 1, wherein the over-voltage detector generating the over-voltage signal according to the auxiliary current is the over-voltage detector generating the over-voltage signal according to the auxiliary current and a first reference current, or according to an auxiliary voltage corresponding to the auxiliary current and a first reference voltage; the zero-crossing signal generator generating the zero-crossing signal according to the auxiliary current is the zero-crossing signal generator generating the zero-crossing signal according to the auxiliary current and a second reference current, or according to the auxiliary voltage and a second reference voltage.

3. The control circuit of claim 1, further comprising:
a current to voltage converter coupled to the subtractor for generating the auxiliary voltage according to the auxiliary current.

4. The control circuit of claim 1, wherein the multi-functional pin is coupled to a rectifier of the power converter through a diode.

5. The control circuit of claim 1, further comprising:
a switching circuit coupled to the multi-functional pin;
a brown-out detection circuit coupled to the switching circuit for generating a brown-out signal according to a detection voltage corresponding to a peak value of a positive half cycle of an alternating current voltage and a third reference voltage when the alternating current voltage is at the positive half cycle and the power switch is turned on; and
an over-temperature detection circuit coupled to the switching circuit for generating an over-temperature signal according to a voltage signal corresponding to an ambient temperature and a fourth reference voltage when the alternating current voltage is at a negative half cycle and the power switch is turned on;
wherein the control circuit generates a brown-out protection signal to the power switch according to the brown-out signal, or generates an over-temperature protection signal to the power switch according to the over-temperature signal.

6. The control circuit of claim 5, wherein when the alternating current voltage is at the positive half cycle, the switching circuit makes the brown-out detection circuit be coupled to the multi-functional pin, and the switching circuit generates the detection voltage according to a peak current corresponding to the peak value of the positive half cycle of the alternating current voltage.

7. The control circuit of claim 5, wherein when the alternating current voltage is at the negative half cycle, the switching circuit makes the over-temperature detection circuit be coupled to the multi-functional pin to let a thermistor coupled to the multi-functional pin generate the voltage signal according to a third reference current.

8. The control circuit of claim 7, wherein the thermistor is coupled to the multi-functional pin through a diode.

9. The control circuit of claim 1, wherein the input current corresponds to an alternating current voltage.

10. An operation method applied to a brown-out protection, an over-temperature protection, and an over-voltage protection of a control circuit of a power converter, the control circuit comprising a multi-functional pin, a zero-crossing signal generator, an over-voltage detector, a sample and hold unit, a subtractor, a current to voltage converter, a switching circuit, a brown-out detection circuit, a counter, and an over-temperature detection circuit, wherein the multi-functional pin is coupled to a rectifier of the power converter and a thermistor, the operation method comprising:
the sample and hold unit generating a sampling current according to an input current received by the multi-functional pin, and the brown-out detection circuit or the over-temperature detection circuit executing a first corresponding operation according to an alternating current voltage when a power switch of the power converter is turned on;
the multi-functional pin receiving an auxiliary current generated by an auxiliary winding of the power converter and the input current when the power switch is turned off;
the subtractor subtracting the input current received by the multi-functional pin according to the sampling current to filter the auxiliary current, wherein the sampling current is substantially equal to the input current when the power switch is turned off; and
the over-voltage detector or the zero-crossing signal generator executing a second corresponding operation according to the auxiliary current when the power switch is turned off.

11. The operation method of claim 10, wherein the over-voltage detector or the zero-crossing signal generator executing the second corresponding operation according to the auxiliary current when the power switch is turned off comprises:
the over-voltage detector generating an over-voltage signal when the auxiliary current is greater than a first reference current.

12. The operation method of claim 11, further comprising:
the control circuit generating an over-voltage protection signal to the power switch according to the over-voltage signal.

13. The operation method of claim 10, wherein the over-voltage detector or the zero-crossing signal generator executing the second corresponding operation according to the auxiliary current when the power switch is turned off comprises:
the current to voltage converter generating an auxiliary voltage according to the auxiliary current; and
the over-voltage detector generating an over-voltage signal when the auxiliary voltage is greater than a first reference voltage.

14. The operation method of claim 13, further comprising:
the control circuit generating an over-voltage protection signal to the power switch according to the over-voltage signal.

15. The operation method of claim 10, wherein the over-voltage detector or the zero-crossing signal generator executing the second corresponding operation according to the auxiliary current when the power switch is turned off comprises:
the zero-crossing signal generator generating a zero-crossing signal according to the auxiliary current and a second reference current when the auxiliary current is less than a first reference current.

16. The operation method of claim 15, further comprising:
the counter generating a control signal according to the zero-crossing signal and a predetermined quantity; and
the control circuit generating a switch control signal to the power switch according to the control signal.

17. The operation method of claim 10, wherein the over-voltage detector or the zero-crossing signal generator executing the second corresponding operation according to the auxiliary current when the power switch is turned off comprises:
the current to voltage converter generating an auxiliary voltage according to the auxiliary current; and
the zero-crossing signal generator generating a zero-crossing signal according to the auxiliary voltage and a second reference voltage when the auxiliary voltage is less than a first reference voltage.

18. The operation method of claim 17, further comprising:
the counter generating a control signal according to the zero-crossing signal and a predetermined quantity; and
the control circuit generating a switch control signal to the power switch according to the control signal.

19. The operation method of claim 10, wherein the sample and hold unit generating the sampling current according to the input current received by the multi-functional pin is the sample and hold unit generating the sampling current corresponding to a positive half cycle of the alternating current voltage according to the input current received by the multi-functional pin when the alternating current voltage is at the positive half cycle.

20. The operation method of claim 10, wherein the brown-out detection circuit or the over-temperature detection circuit executing the first corresponding operation according to the alternating current voltage comprises:
the brown-out detection circuit generating a brown-out signal according to a detection voltage corresponding to a peak value of a positive half cycle of the alternating current voltage and a third reference voltage when the alternating current voltage is at the positive half cycle and the power switch is turned on; and
the over-temperature detection circuit generating an over-temperature signal according to a voltage signal corresponding to an ambient temperature and a fourth reference voltage when the alternating current voltage is at a negative half cycle and the power switch is turned on.

21. The operation method of claim 20, further comprising:
the control circuit generating a brown-out protection signal to the power switch according to the brown-out signal.

22. The operation method of claim 20, further comprising:
the control circuit generating an over-temperature protection signal to the power switch according to the over-temperature signal.

23. The operation method of claim 20, wherein the switching circuit makes the brown-out detection circuit be coupled to the multi-functional pin, and the switching circuit generates the detection voltage according to the input current when the alternating current voltage is at the positive half cycle.

24. The operation method of claim 20, wherein the switching circuit makes the over-temperature detection circuit be coupled to the multi-functional pin to let a thermistor generate the voltage signal according to a third reference current when the alternating current voltage is at the negative half cycle.

25. An operation method applied to a brown-out protection, an over-temperature protection, and an over-voltage protection of a control circuit of a power converter, the control circuit comprising a multi-functional pin, a zero-crossing signal generator, an over-voltage detector, a sample and hold unit, a subtractor, a counter, and a current to voltage converter, the operation method comprising:
the sample and hold unit generating a sampling current according to an input current received by the multi-functional pin when a power switch of the power converter is turned on and an alternating current voltage is at a positive half cycle;
the multi-functional pin receiving an auxiliary current generated by an auxiliary winding of the power converter and the input current when the power switch is turned off;
the subtractor subtracting the input current received by the multi-functional pin according to the sampling current to filter the auxiliary current when the power switch is turned off, wherein the sampling current is substantially equal to the input current; and
the over-voltage detector or the zero-crossing signal generator executing a third corresponding operation according to the auxiliary current when the power switch is turned off.

26. The operation method of claim 25, wherein the over-voltage detector or the zero-crossing signal generator executing the third corresponding operation according to the auxiliary current when the power switch is turned off comprises:
the over-voltage detector generating an over-voltage signal when the auxiliary current is greater than a first reference current.

27. The operation method of claim 26, further comprising:
the control circuit generating an over-voltage protection signal to the power switch according to the over-voltage signal.

28. The operation method of claim 25, wherein the over-voltage detector or the zero-crossing signal generator executing the third corresponding operation according to the auxiliary current when the power switch is turned off comprises:
the current to voltage converter generating an auxiliary voltage according to the auxiliary current; and
the over-voltage detector generating an over-voltage signal when the auxiliary voltage is greater than a first reference voltage.

29. The operation method of claim 28, further comprising:
the control circuit generating an over-voltage protection signal to the power switch according to the over-voltage signal.

30. The operation method of claim 25, wherein the over-voltage detector or the zero-crossing signal generator executing the third corresponding operation according to the auxiliary current when the power switch is turned off comprises:
the zero-crossing signal generator generating a zero-crossing signal according to the auxiliary current and a second reference current when the auxiliary current is less than a first reference current.

31. The operation method of claim 30, further comprising:
the counter generating a control signal according to the zero-crossing signal and a predetermined quantity; and
the control circuit generating a switch control signal to the power switch according to the control signal.

32. The operation method of claim 25, wherein the over-voltage detector or the zero-crossing signal generator executing the third corresponding operation according to the auxiliary current when the power switch is turned off comprises:
the current to voltage converter generating an auxiliary voltage according to the auxiliary current; and
the zero-crossing signal generator generating the zero-crossing signal according to the auxiliary voltage and a second reference voltage when the auxiliary voltage is less than a first reference voltage.

33. The operation method of claim 32, further comprising:
the counter generating a control signal according to the zero-crossing signal and a predetermined quantity; and
the control circuit generating a switch control signal to the power switch according to the control signal.

* * * * *